United States Patent [19]
Morelli et al.

[11] Patent Number: 5,688,070
[45] Date of Patent: Nov. 18, 1997

[54] CONNECTING A SHAFT TO A BORE

[75] Inventors: Peter Alan Morelli; Kym Farrand Taylor; David Makin, all of Huddersfield, Great Britain

[73] Assignee: David Brown Engineering Limited, Huddersfield, Great Britain

[21] Appl. No.: 549,221

[22] Filed: Oct. 27, 1995

Related U.S. Application Data

[63] Continuation of Ser. No. 358,569, Dec. 13, 1994, abandoned, which is a continuation of Ser. No. 59,674, May 12, 1993, abandoned.

[30] Foreign Application Priority Data

Sep. 9, 1992 [GB] United Kingdom ............... 9219091

[51] Int. Cl.⁶ ............................................... F16B 3/00
[52] U.S. Cl. ................................... 403/356; 403/355
[58] Field of Search .............................. 403/355, 356, 403/358

[56] References Cited

U.S. PATENT DOCUMENTS

| | | | |
|---|---|---|---|
| 2,127,053 | 8/1938 | Cambridge | 403/356 |
| 2,807,485 | 9/1957 | Seibert . | |
| 2,996,302 | 8/1961 | Haviland et al. | 403/356 |
| 3,487,903 | 1/1970 | Stickan | 403/356 |
| 4,624,597 | 11/1986 | Johnson et al. | 403/355 |
| 5,119,995 | 6/1992 | Kohler et al. | 403/356 |
| 5,181,432 | 1/1993 | Allen | 403/356 |

FOREIGN PATENT DOCUMENTS

| | | |
|---|---|---|
| A-0 247 961 | 12/1987 | European Pat. Off. . |
| A-567 959 | 3/1924 | France . |
| 2652393 | 3/1991 | France ............... 403/356 |
| 258620 | 4/1913 | Germany ............ 403/356 |
| A-838 384 | 7/1949 | Germany . |
| 280925 | 12/1930 | Italy .................. 403/356 |
| 479901 | 12/1975 | U.S.S.R. ............ 403/356 |

*Primary Examiner*—John T. Kwon
*Attorney, Agent, or Firm*—Nikaido, Marmelstein, Murray & Oram, LLP

[57] ABSTRACT

An assembly for drivably connecting a shaft to a bore includes a member having a bore, wherein a keyway is included in the bore having a semi-circular cross section. A shaft is provided which is configured to have a non-interference fit in the bore, and a surface of the shaft is formed with a keyway having a rectangular cross-section. A unitary component is provided, and is adapted to connect the shaft to the bore of the member and to allow driving forces to be transmitted between the shaft and the bore. The unitary component includes engagement means formed on an inner surface thereof which enables the component to be coupled to the keyway in the shaft. The unitary component also includes an integral key having a semi-circular outer surface corresponding to and adapted to engage the semi-circular keyway formed in the bore.

12 Claims, 4 Drawing Sheets

5,688,070

CONNECTING A SHAFT TO A BORE

This application is a continuation-in-part of application Ser. No. 08/358,569 filed Dec. 13, 1994 now abandoned, which is a continuation of application Ser. No. 08/059,674, filed May 12, 1993, now abandoned.

This invention relates to a unitary component for driveably connecting a shaft to a bore of a member.

BACKGROUND OF THE INVENTION

It is particularly, but by no means exclusively, relevant to the flange-mounting of electric motors on off-the-shelf gear units. It is commonplace for the purchasers of such units to fit them with different sizes of motors to suit different gear ratios made available by fitting different gears in the same gear casing, and said motors frequently have different sizes of drive shafts. The input gear of such a unit is driveably connected to a steel sleeve mounted in bearings in the gear casing and having a bore with a conventional key-way of rectangular cross-section for the reception of the motor drive shaft. Where the motor drive shaft is nominally of the same diameter as the bore, they are driveably interconnected by a conventional steel key. Where, as frequently happens, the motor drive shaft is of smaller diameter than the bore, a slotted nylon sleeve is fitted to fill the annular space between them and they are driveably interconnected by a steel key of greater than normal height extending through the slot in said sleeve. Due to the fretting corrosion experienced between like metals in driving contact with one another, to the tendency of a key of greater than normal height to be tilted over by the torque transmitted through it, and to axial misalignment of the shaft and the sleeve due to the mounting flanges of the motor and the gear unit frequently being out of square with each other, failures of the key or of the bearing in the unit are not uncommon.

The object of the present invention is to avoid this problem.

SUMMARY OF THE INVENTION

According to the invention, a unitary component for driveably connecting a shaft to a bore of a member includes means enabling the component to be driveably connected to a conventional keyway of rectangular cross-section formed in the shaft, and an integral key of curved cross-section adapted to engage in a keyway of correspondingly curved cross-section formed in the bore.

For the purpose of driveably connecting together a shaft and a bore which are nominally of the same diameter, the means are preferably an integral key of the same rectangular cross-section as the keyway in the shaft.

The key of curved cross-section is preferably circumferentially wider than the key of rectangular cross-section.

Preferably, those surfaces of the key of curved cross-section which are adapted to overlie the periphery of the shaft have a concave shape corresponding to the convex shape of said periphery.

Preferably, also, those surfaces of the key of curved cross-section which are adapted to overlie the periphery of the shaft are undercut at their juncture with the key of rectangular cross-section.

For the purpose of driveably connecting a shaft to a bore of larger diameter than said shaft, the unitary component preferably includes also an integral sleeve adapted to fit between the shaft and the bore, the integral key of curved cross-section being formed on the outer periphery of said sleeve and the means being a keyway formed in said inner periphery of the sleeve and having the same rectangular cross-section as the keyway in the shaft, whereby said keyways are adapted to be driveably interconnected by a conventional separate key of rectangular cross-section.

The centre-lines of the key formed on the outer periphery and the keyway formed in the inner periphery of the sleeve preferably lie on the same radius of said sleeve, said key being circumferentially wider than said keyway.

The sleeve may be split longitudinally.

In that case, the sleeve is preferably split diametrically opposite the radius on which lie the centre-lines of the key formed on the outer periphery and the keyway formed in the inner periphery of the sleeve.

The unitary component is preferably formed of flexible reinforced plastics material.

Preferably the material is glass-filled nylon.

When formed of flexible reinforced plastics material such as glass-filled nylon, the unitary component may comprise an extruded section.

When the unitary component includes an integral sleeve and is formed of flexible reinforced plastics material, the sleeve preferably has a multiplicity of small longitudinally extending circumferentially spaced ridges formed on its outer periphery to take up manufacturing tolerances.

The unitary component may alternatively be formed of sintered non-ferrous metal.

In that case, the metal is preferably phosphor-bronze.

When the unitary component includes an integral sleeve and is formed of non-extruded flexible reinforced plastics material or of sintered non-ferrous metal, the sleeve preferably has an inwardly projecting flange at one end adapted to engage between a blind end of the bore and the adjacent end of the shaft.

BRIEF DESCRIPTION OF THE DRAWINGS

The invention will now be described, by way of example only, with reference to the accompanying drawings in which.

DESCRIPTION OF THE PREFERRED EMBODIMENTS

Figure 1:
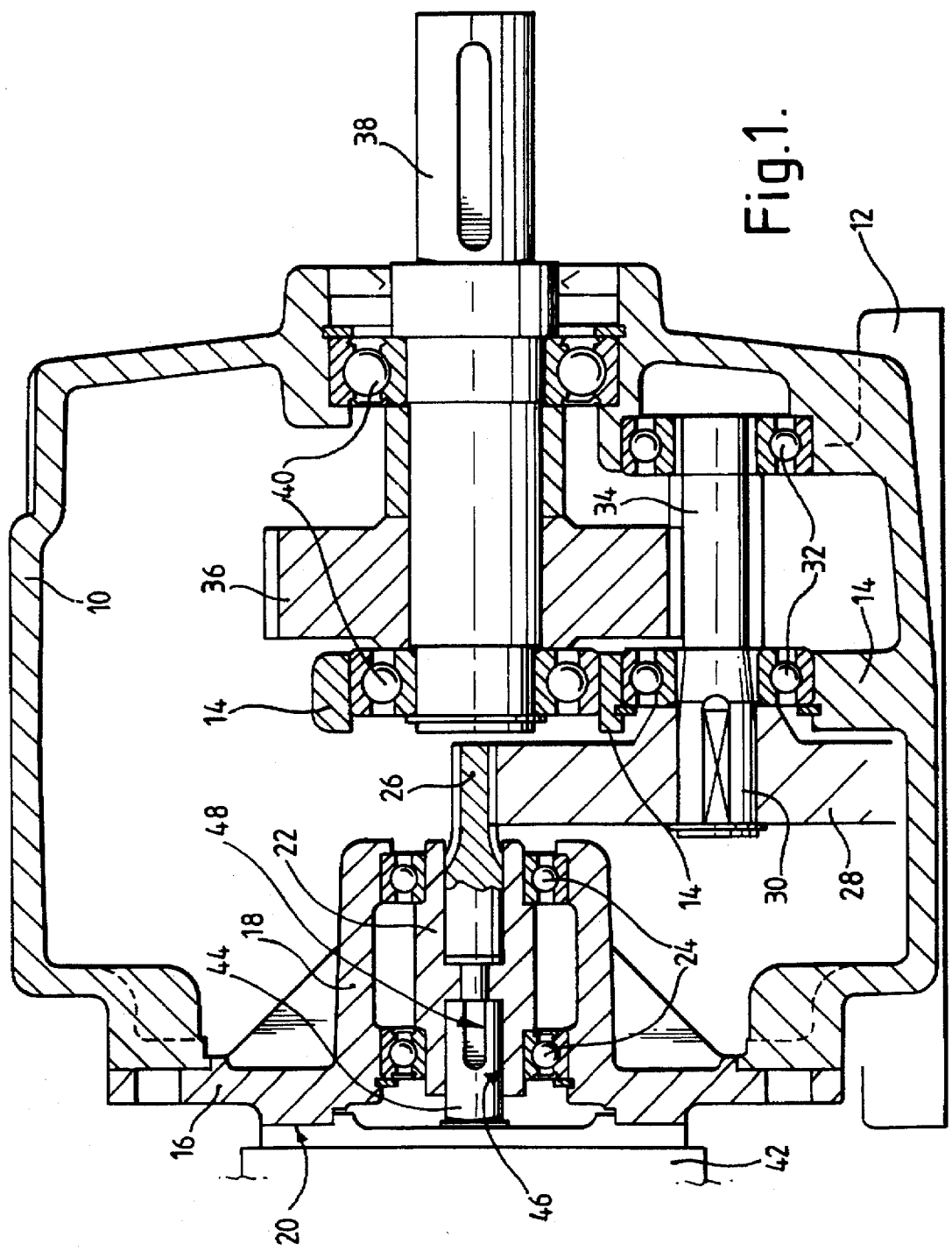
FIG. 1 is a sectional side elevation of a gear unit and part of an electric motor flange-mounted at its left-hand end.
Figure 2:
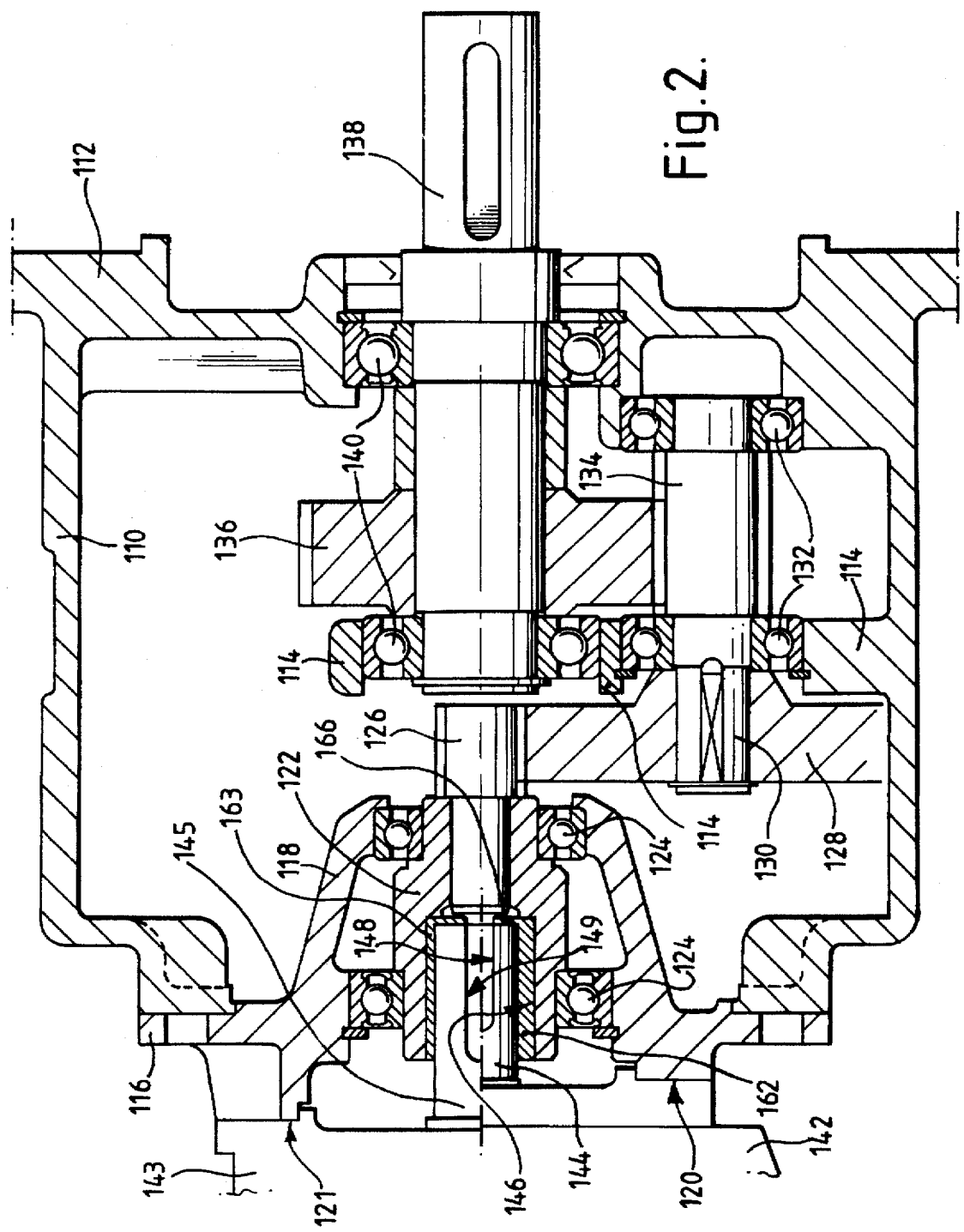
FIG. 2 is a sectional side elevation of a similar gear unit and parts of two different electric motors flange-mounted respectively above and below the input centre-line at its left-hand end.

Referring now to the drawings, a unitary main casing 10 of the double reduction gear unit shown in FIG. 1 is essentially the same as a unitary main casing 110 of the double reduction gear unit shown in FIG. 2, the only difference being that the main casing 10 is adapted to stand on feet 12 whereas the main casing 110 is adapted to be mounted by a flange 112. The main casing 10 includes an internal web 14, and has fixed to it by set-screws (not shown) an end plate 16 incorporating a bearing housing 18 and a motor mounting flange 20. A steel sleeve 22 mounted in beatings 24 in the housing 18 has an input pinion 26 driveably connected to it by any suitable means such as pressing, adhesive, a key, splines, or serrations. The input pinion 26 meshes with a gear wheel 28 rigidly secured on an intermediate shaft 30 mounted in bearings 32 in the main casing 10, and a pinion 34 integral with the intermediate shaft 30 meshes with an output gear wheel 36 rigidly secured on an output shaft 38 which is mounted in bearings 40 in the main casing 10 so as to be co-axial with the sleeve 22 and pinion 26.

The gear unit shown in FIG. 2 has parts corresponding to those of the gear unit shown in FIG. 1, and these are indicated by the same reference numerals with the prefix 1, for example the output shaft in FIG. 2 is numbered 138. The centre distance between the intermediate shaft 134 and the output shaft 138 is the same as that between the shafts 134 and 138, but the pinions 26 and 34 have smaller pitch circle diameters than the pinions 126 and 134 while the gear wheels 28 and 36 have larger pitch circle diameters than the gear wheels 128 and 136 so that the speed reduction ratio of the gear unit shown in FIG. 1 is considerably greater than that of the gear unit shown in FIG. 2.

Figure 3:
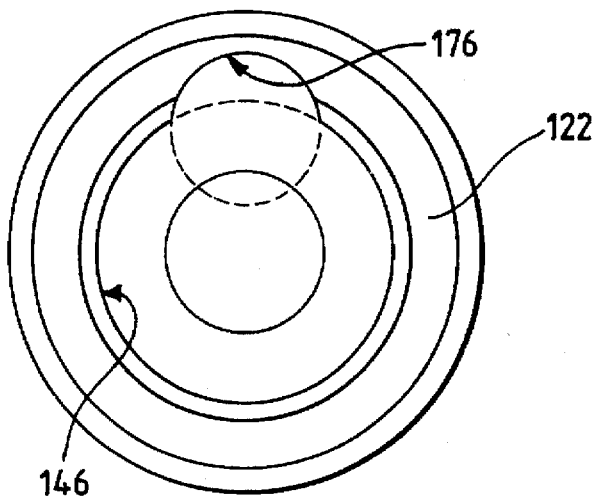
FIG. 3 is an end elevation on a larger scale of an input sleeve forming part of the gear unit shown in FIG. 2.

Consequently, the gear unit shown in FIG. 1 requires a relatively small electric motor 42 with a small drive shaft 44 which in the embodiment illustrated has the same nominal diameter as a bore 46 in that end of the sleeve 22 remote from the pinion 26. The drive shaft 44 has a conventional keyway 48 of rectangular cross-section and is driveably connected to the bore 46 by a unitary component 50 (see FIG. 4) made by cutting an appropriate length from an extruded section of flexible reinforced plastics material constituted by 30 per cent to 40 per cent glass-filled nylon. The component 50 has an integral key 52 of the same rectangular cross-section as the keyway 48 for engagement driveably therein, said key having chamfered corners 54, and an integral key 56 of curved cross-section for engagement in a keyway (not specifically shown but like the keyway 176 in FIG. 3 hereinafter referred to) of correspondingly curved cross-section formed in the bore 46. The key 56 is circumferentially wider than the key 52, and those surfaces 58 of the key 56 which are adapted to overlie the periphery of the drive shaft 44 have a concave shape corresponding to the convex shape of said periphery, so as to give the component 50 maximum support against being tilted over by the torque transmitted through it. Undercuts 60 are provided where the surfaces 58 join the key 52, to ensure that said surfaces make unimpeded close contact with the periphery of the drive shaft 44. The flexible plastics component 50 obviates fretting corrosion at the motor/gear unit drive interface and accommodates any misalignment due to the mounting flange 20 on the gear unit and that on the electric motor 42 being out of square with each other.

The gear unit shown in FIG. 2 can be driven by several different larger electric motors. Two such motors 142 and 143 are partially illustrated having different dimensions including different sizes of drive shafts 144 and 145 each of which is of differingly smaller diameter than a bore 146 in that end of the sleeve 122 remote from the pinion 126. The shafts 144 and 145 have different sized conventional keyways 148 and 149. The differing dimensions of the motors 142 and 143 require the end plate 116 to have alternative mounting flanges 120 or 121. The drive shafts 144 and 145 are alternatively driveably connected to the bore 146 by respective unitary components 162 and 163 which are identical other than dimensionally. By way of example, the component 162 shown in FIG. 5 will now be described in detail.

It is formed of moulded flexible reinforced plastics material constituted by 30 per cent to 40 per cent glass-filled nylon. The component 162 comprises a sleeve 164 adapted to fit between the shaft 144 and the bore 146, said sleeve having an inwardly projecting flange 166 at one end adapted to engage between a blind end of the bore 146 and the adjacent end of the shaft 144. The sleeve 164 has a multiplicity of small longitudinal extending circumferentially spaced ridges 168 formed on its outer periphery to take up manufacturing tolerances. A keyway 170 having the same rectangular cross-section as the keyway 148 is formed in the inner periphery of the sleeve 164, and both said inner periphery and the keyway 170 have a chamfer 172 at that end remote from the flange 166. The sleeve 164 also has an integral key 174 of curved cross-section formed on its outer periphery and adapted to engage in a keyway 176 (see FIG. 3) of correspondingly curved cross-section formed in the bore 146. The keyways 148 and 170 are adapted to be driveably interconnected by a conventional separate steel key 171 of rectangular cross-section shown in broken lines. The centre-lines of the key 174 and the keyway 170 lie on the same radius of the sleeve 164, and the key 174 is circumferentially wider than the keyway 170 to maintain adequate strength despite their proximity to each other. The flexible plastics component 162 operates in principle exactly like the superficially dissimilar component 50 hereinbefore described, and likewise obviates fretting corrosion at the motor/gear unit drive interface and accommodates any misalignment due to the mounting flange 120 on the gear unit and that on the electric motor 142 being out of square with each other.

Figure 5:
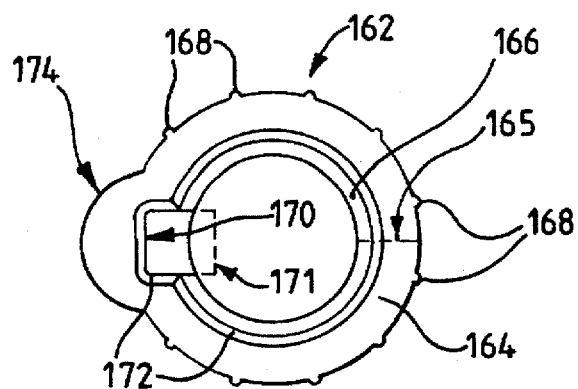
FIG. 5 is an end elevation on a larger scale of another form of unitary component for driveably connecting the drive shaft of the motor shown below the input centre-line to the input sleeve of the gear unit shown in FIG. 2.

In a modification of the embodiment of the invention shown in FIG. 5, the sleeve 164 is split longitudinally as indicated at 165 in broken lines at a point diametrically opposite the radius on which lie the centre-lines of the key 174 and the keyway 170, to increase the flexibility of the component 162. In another modification of said embodiment, the flange 166 is omitted and the component 162 can then be made by cutting an appropriate length from an extruded section of flexible reinforced plastics material.

Figure 4:
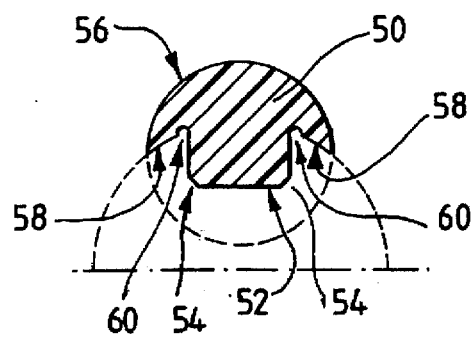
FIG. 4 is a cross-section on a larger scale of one form of unitary component for driveably connecting the motor drive shaft to an input sleeve forming part of the gear unit shown in FIG. 1.

In a modification of both embodiments of the invention shown in FIGS. 4 and 5, the components 50 and 162 can be formed of sintered non-ferrous metal constituted by phosphor-bronze.

This equally well obviates the problem of fretting corrosion at the motor/gear unit drive interface, but only provides an estimated 10 per cent of the flexibility of the reinforced plastics components and is more costly.

Figure 6F:
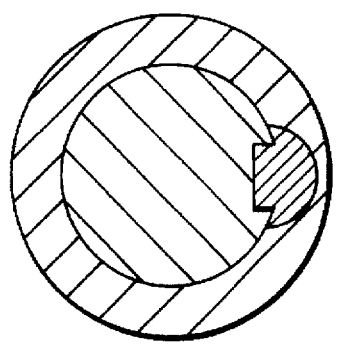
FIGS. 6a through 6h show diagrammatically three different size ranges embracing both forms of unitary components.
Figure 6G:
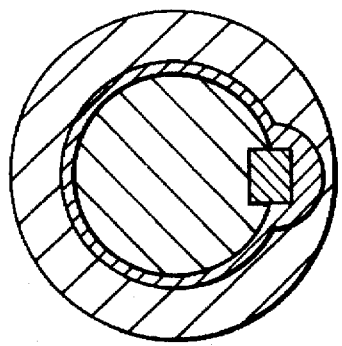
Figure 6H:
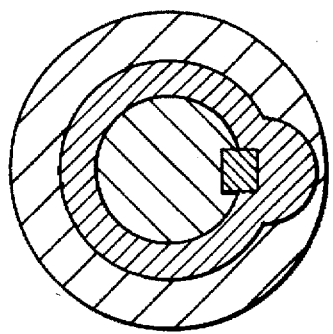
Figure 6C:
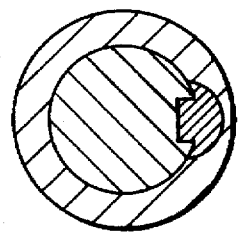
Figure 6D:
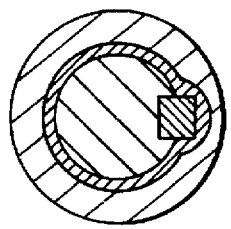
Figure 6E:
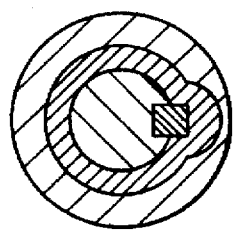
Figure 6A:
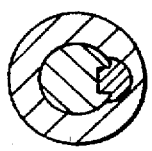
Figure 6B:
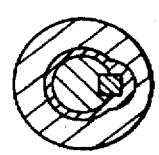

Significantly, different sizes of gear units having different sizes of steel sleeves such as 22 and 122 driveably connected to their input pinions require corresponding size ranges of components such as 50 and 162. One such range is shown in FIGS. 6a and 6b in the first of which a steel sleeve of small bore size is driveably connected to a motor shaft of nominally the same diameter as said bore by a sleeveless component such as 50, and in the second of which a steel sleeve of the same bore size is driveably connected to a motor shaft of smaller diameter than said bore by a sleevetype component such as 162 and a conventional steel key such as 171. A second, intermediate-sized range is shown in FIGS. 6c to 6e, and a third, larger range is shown in FIGS. 6f to 6h. The drawings referred to in this paragraph are believed to be self-explanatory in the light of the preceding description, and are included merely to demonstrate the size ranges possible.

This invention is broadly applicable to the driving connection of a shaft to a bore of a member in any sort of mechanism.

The reader's attention is directed to all papers and documents which are filed concurrently with or previous to this specification in connection with this application and which are open to public inspection with this specification, and contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. An assembly for drivably connecting two members, wherein the two members include a shaft and a member having a bore therein, wherein said shaft is configured to have a non-interference fit in the bore of the member, said shaft having a keyway in a surface thereof, said keyway having a rectangular cross-section, said assembly also including a unitary component for transmitting driving forces between the shaft and the member, said unitary component including a drive portion on an inner surface thereof, said drive portion transmitting the driving forces from said keyway in said shaft to said unitary component, said unitary component also comprising an integral key having a semi-circular outer surface, said semi-circular outer surface engaging a corresponding semi-circular keyway formed in an inner surface of said bore of said member, wherein said semi-circular outer surface of said unitary member meets said inner surface of the unitary member to form a corner which extends longitudinally along said unitary component.

2. An assembly as recited in claim 1, wherein the semi-circular outer surface of said integral key and the inner surface of the integral key meet at an acute angle, thereby forming the corner as an acute corner which extends longitudinally along the unitary component.

3. An assembly as recited in claim 1, wherein the inner surface of the component is arcuate.

4. An assembly as recited in claim 2, wherein the inner surface of the component is arcuate.

5. An assembly according to claim 1, wherein the drive portion comprises an integral rectangular key corresponding to the keyway of the shaft.

6. An assembly according to claim 5, wherein the inner surface is undercut at a junction of the inner surface and the integral rectangular key.

7. An assembly according to claim 1, wherein said unitary component comprises a reinforced plastics material.

8. An assembly according to claim 7, wherein the unitary component comprises a glass-filled nylon.

9. An assembly according to claim 1, wherein said unitary component comprises a sintered non-ferrous metal.

10. An assembly according to claim 9, wherein the unitary component comprises phosphor-bronze.

11. An assembly according to claim 2, wherein said inner surface of the unitary component is arcuately shaped to correspond with an arcuate outer circumference of the shaft, and wherein said shaft is circular in cross-section, except for the keyway disposed thereupon.

12. An assembly for drivably connecting two members, wherein the two members include a shaft and a member having a bore therein, wherein said shaft is configured to have a non-interference fit in the bore of the member, said shaft having a cylindrical cross section with a keyway in a surface thereof, said keyway having a rectangular cross-section, said assembly also including a unitary component for allowing driving forces to be transmitted between the shaft and the member, said unitary component including a drive portion on an inner surface thereof, said inner surface having an arcuate cross section which corresponds to an outer surface of the shaft whereby the drive portion and the arcuate outer surface of the integral key transmits drive forces from the keyway and the outer surface of the shaft to the unitary component, said drive portion engaging said keyway in said shaft, said unitary component also comprising an integral key having a semi-circular outer surface, said semi-circular outer surface engaging a corresponding semi-circular keyway formed in an inner surface of said bore of said member, and wherein said semi-circular outer surface of said unitary member meets said inner surface thereof to form a corner which extends longitudinally along said unitary component.

* * * * *